United States Patent
Hein et al.

(10) Patent No.: US 10,695,705 B2
(45) Date of Patent: *Jun. 30, 2020

(54) AIR FILTER COMPRISING A MULTILAYER FILTER MATERIAL

(71) Applicant: Mahle International GmbH, Stuttgart (DE)

(72) Inventors: Martin Hein, Stuttgart (DE); Katharina Merz, Stuttgart (DE); Birgit Renz, Marbach (DE)

(73) Assignee: Mahle International GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/085,840

(22) PCT Filed: Mar. 7, 2017

(86) PCT No.: PCT/EP2017/055278
§ 371 (c)(1),
(2) Date: Sep. 17, 2018

(87) PCT Pub. No.: WO2017/157721
PCT Pub. Date: Sep. 21, 2017

(65) Prior Publication Data
US 2019/0344209 A1 Nov. 14, 2019

(30) Foreign Application Priority Data
Mar. 18, 2016 (DE) .......... 10 2016 204 525

(51) Int. Cl.
*B01D 39/16* (2006.01)
*B01D 53/04* (2006.01)
(Continued)

(52) U.S. Cl.
CPC ..... *B01D 46/0036* (2013.01); *B01D 39/1623* (2013.01); *B01D 39/18* (2013.01);
(Continued)

(58) Field of Classification Search
CPC ................ B01D 39/1623; B01D 39/18; B01D 39/2058; B01D 46/0036; B01D 46/0028;
(Continued)

(56) References Cited

U.S. PATENT DOCUMENTS 4,250,172 A * 2/1981 Mutzenberg ....... B01D 39/1607
442/6
4,370,301 A 1/1983 Doi et al.
(Continued)

FOREIGN PATENT DOCUMENTS

DE 3904623 A1 8/1990
DE 19817703 A1 11/1999
(Continued)

OTHER PUBLICATIONS

English abstract for DE-102009021020.
(Continued)

*Primary Examiner* — Frank M Lawrence, Jr.
(74) *Attorney, Agent, or Firm* — Fishman Stewart PLLC

(57) ABSTRACT

A multilayer filter material for an interior air filter element of an air conditioning system of a vehicle may include an ion exchange layer including ion exchange particles and a plurality of further layers. The ion exchange layer may directly adjoin at least one of the plurality of further layers. The plurality of further layers may include an active layer including non-impregnated active carbon particles, and an impregnation layer including impregnated active carbon particles. The active layer may be arranged between the ion exchange layer and the impregnation layer. The ion exchange layer may be hygroscopic and may contain ions which form a toxic environment with water. The impregnation layer may include a component of active carbon particles impregnated with potassium iodide and a component of active carbon particles impregnated with potassium car-
(Continued)

bonate. The component impregnated with potassium iodide may be greater than the component impregnated with potassium carbonate.

20 Claims, 3 Drawing Sheets

(51) Int. Cl.
| | |
|---|---|
| *B01D 46/00* | (2006.01) |
| *B01D 39/18* | (2006.01) |
| *B01D 39/20* | (2006.01) |
| *B32B 5/02* | (2006.01) |
| *B32B 5/26* | (2006.01) |
| *B60H 3/00* | (2006.01) |
| *B60H 3/06* | (2006.01) |

(52) U.S. Cl.
CPC ..... *B01D 39/2058* (2013.01); *B01D 46/0028* (2013.01); *B01D 46/0038* (2013.01); *B01D 53/04* (2013.01); *B32B 5/022* (2013.01); *B32B 5/26* (2013.01); *B60H 3/0085* (2013.01); *B60H 3/06* (2013.01); *B01D 2239/045* (2013.01); *B01D 2239/0407* (2013.01); *B01D 2239/0442* (2013.01); *B01D 2239/0464* (2013.01); *B01D 2239/065* (2013.01); *B01D 2239/0618* (2013.01); *B01D 2253/102* (2013.01); *B01D 2253/206* (2013.01); *B01D 2253/25* (2013.01); *B01D 2257/90* (2013.01); *B01D 2259/4145* (2013.01); *B01D 2259/4146* (2013.01); *B01D 2259/4566* (2013.01); *B01D 2275/10* (2013.01); *B01D 2279/40* (2013.01); *B32B 2264/104* (2013.01); *B32B 2264/108* (2013.01); *B32B 2307/7145* (2013.01); *B32B 2307/724* (2013.01); *B32B 2307/758* (2013.01); *B32B 2605/00* (2013.01); *B60H 2003/0691* (2013.01)

(58) Field of Classification Search
CPC ............... B01D 46/0038; B01D 53/04; B01D 53/0407; B01D 2239/0407; B01D 2239/0442; B01D 2239/045; B01D 2239/0464; B01D 2239/0618; B01D 2239/065; B01D 2253/102; B01D 2253/206; B01D 2253/25; B01D 2257/90; B01D 2259/4566; B01D 2259/4145; B01D 2259/4146; B01D 2275/10; B01D 2279/40; B23B 5/022; B23B 5/26; B23B 2264/104; B23B 2264/108; B23B 2307/7145; B23B 2307/724; B23B 2307/758; B23B 2605/00; B60H 3/0085; B60H 3/06; B60H 2003/0691
USPC ........... 96/132, 134, 135, 153, 154; 502/416
See application file for complete search history.

(56) References Cited

U.S. PATENT DOCUMENTS

| | | | |
|---|---|---|---|
| 5,772,738 A * | 6/1998 | Muraoka | B01D 46/0023 55/385.2 |
| 7,132,007 B1 * | 11/2006 | von Blucher | B01D 53/02 95/90 |
| 9,242,202 B2 | 1/2016 | Boehringer et al. | |
| 2004/0237790 A1 * | 12/2004 | von Blucher | A62D 5/00 96/154 |
| 2006/0225574 A1 | 10/2006 | Braeunling et al. | |
| 2017/0320053 A1 * | 11/2017 | Moon | B01J 47/12 |
| 2018/0065070 A1 * | 3/2018 | Merz | B01D 46/0036 |
| 2019/0001253 A1 * | 1/2019 | Hitzke | B01D 39/2062 |

FOREIGN PATENT DOCUMENTS

| | | |
|---|---|---|
| DE | 102005016677 A1 | 10/2006 |
| DE | 102009021020 A1 | 11/2010 |
| DE | 102012007503 A1 | 10/2013 |
| DE | 102013008392 A1 | 11/2014 |
| EP | 2527023 A2 | 11/2012 |
| JP | H02-22612 A | 1/1990 |
| JP | H02-26612 A | 1/1990 |
| WO | 01/70391 A1 | 9/2001 |
| WO | 2016150851 A1 | 9/2016 |

OTHER PUBLICATIONS

English abstract for JP-H02-22612.
English abstract for DE-19817703.
English abstract for JP-H02-26612.
German Search Report dated Jul. 24, 2019 for copending German Application No. DE102016204525.3.
English Abstract for DE3904623A1.
English Abstract for DE102013008392A1.

* cited by examiner

AIR FILTER COMPRISING A MULTILAYER FILTER MATERIAL

CROSS-REFERENCE TO RELATED APPLICATIONS

This application claims priority to International Patent Application No. PCT/EP2017/055278, filed on Mar. 7, 2017, and German Patent Application No. DE 10 2016 204 525.3, filed on Mar. 18, 2016, the contents of both of which are hereby incorporated by reference in their entirety.

TECHNICAL FIELD

The present invention relates to a multilayer filter material for an interior air filter of a vehicle. The invention relates furthermore to an interior air filter for an air conditioning system of a vehicle, which is produced by means of such a multilayer filter material. Finally, the present invention relates to an air conditioning system for a vehicle, which is equipped with at least one such interior air filter.

BACKGROUND

In vehicles, in particular in road vehicles, a need exists to supply a vehicle interior, preferably a passenger compartment, with clean air. The supplying of the vehicle interior with air usually takes place by means of an air conditioning system which draws in air from the interior, cleans it by means of an interior air filter, and returns it to the interior (recirculating air operation), or draws in fresh air from the environment and cleans it by means of the interior air filter and delivers it to the interior (fresh air operation). Likewise, in modern air conditioning systems any intermediate positions between such a recirculating air operation and such a fresh air operation are possible (mixed air operation). Whereas such an interior air filter originally only had to filter out coarse impurities from the air, the demands on such interior air filters and the filter materials coming into use here have increased constantly. In the meantime, by means of an interior air filter, a cleaning of the drawn-in air of pollen, fine dust and odours is to be achieved. In particular, the removal of odorous substances from the drawn-in air presents difficulties here, because different odorous substances also require different filter materials. If, however, for an increasing number of different odorous substances a corresponding number of different filter materials becomes necessary, the throughflow resistance of the air filter increases, which prevents an economical mode of operation of the air conditioning system. Therefore, multilayer filter materials preferably come into use, which always represent an optimized compromise for the respective cleaning task. In so far as such an air filter can filter out both particulate impurities, therefore solid and/or liquid impurities, and also gaseous impurities from the air, such an air filter is frequently also designated as a hybrid filter. Such hybrid filters are readily itemized via specifications which generally take the following gases into consideration: n-butane, toluene, sulphur dioxide, nitrogen oxides, ozone. These hybrid filters are specified for example according to ISO Standard 11155 Part 2. However, this standard specification represents odour pollutions which were identified in European areas of high population density approximately 30 years ago. Present-day external air conditions, such as are present in the areas of high population density in Europe and especially in Asia differ, however, from these earlier external air conditions. For example, the ambient air today can contain amines and aldehydes which transport odours and which can not, or can only be insufficiently filtered by the above-mentioned hybrid filters according to standard specification.

From DE 10 2005 016 677 A1 a filter element with a multilayer filter material is known, in which an active layer arranged on the inflow side is provided with active carbon fibres, to which an adsorber layer with granular adsorbents adjoins on the outflow side. A further active layer with active carbon fibres can adjoin this adsorber layer on the outflow side. The adsorbents which are used here can comprise active carbon, zeolites, cyclodextrins, silicates, ion exchangers and aluminosilicates.

From DE 10 2012 007 503 A1 another adsorptive filter medium is known, in which a plurality of first filter layers are provided with a first adsorption substance and a plurality of second filter layers, different from the first filter layers, are provided with a second adsorption substance, which alternate and have different throughflow resistances or respectively pressure losses.

A further adsorptive filter material is known from DE 10 2009 021 020 A1 and contains an exchange resin which is loaded with metal cations.

A further difficulty which can occur in filters of a vehicle air conditioning system is the accumulation and multiplication or respectively growth of microorganisms, such as e.g. bacteria, algae and fungi, on the filter material. These microorganisms can arrive into the passenger compartment from the air stream, so that ultimately the passengers are exposed to these microorganisms.

SUMMARY

The present invention is concerned with the problem of indicating, for a filter material of the type named in the introduction, or respectively for an interior air filter element equipped therewith, or respectively for an air conditioning system equipped therewith, an improved embodiment which is distinguished in particular by a reduced growth of microorganisms. In addition, optionally also an efficient cleaning effect can be aimed for a multiplicity of odorous substances with comparatively small throughflow resistance.

This problem is solved according to the invention by the subject matter of the independent claim(s). Advantageous embodiments are the subject of the dependent claim(s).

The invention is based on the general idea of providing, in a filter material which is constructed having at least two layers, an ion exchange layer and at least one further layer, wherein the ion exchange layer directly adjoins such a further layer. It has been found that such an ion exchange layer is harmful for a range of microorganisms, so that microorganisms can no longer multiply in the filter material, or can only do so at a reduced rate. The contamination of the vehicle occupants by microorganisms is thereby reduced.

An embodiment is preferred in which the ion exchange layer is arranged with respect to a throughflow direction provided for the filter material in the installed state upstream of the further layer, directly adjoining thereto. The microorganisms must therefore necessarily pass through the ion exchange layer, in order to arrive into the respective subsequent layer, so that in the subsequent layer(s) the risk of a multiplication of the microorganisms is reduced.

An embodiment is particularly advantageous, in which the ion exchange layer is hygroscopic and contains ions which form a toxic environment with water. The hygroscopic ion exchange layer absorbs water from the air flow. On the one hand, it is thereby achieved that distinctly less moisture arrives into the respectively subsequent layer, so that the microorganisms which can accumulate there lack a substantial component for biological growth, namely water. Therefore, a multiplication of the microorganisms can be efficiently reduced. On the other hand, said toxic environment arises in the ion exchange layer through the water in connection with the ions, which toxic environment counteracts biological growth in the ion exchange layer. Also, a large proportion of microorganisms, which are exposed to this toxic environment on their way through the ion exchange layer, are killed.

A further development is advantageous, in which the ion exchange layer contains acid ions which form an acid environment with water. Such an acid environment, which has for example a pH value of a maximum of 3.0, is extremely harmful to microorganisms.

According to an advantageous embodiment, an active layer, which has non-impregnated active carbon particles, and an impregnation layer, which has impregnated active carbon particles, can be provided as further layers. Here, the active layer can be arranged between the ion exchange layer and the impregnation layer. In particular here the active layer can be the layer directly adjoining the ion exchange layer.

This embodiment is based on the general idea of equipping the filter material with at least three layers which lie against one another or respectively are layered onto one another in the throughflow direction of the filter material. In accordance with the invention, this concerns at least one active layer which has non-impregnated active carbon particles, an impregnation layer which has impregnated active carbon particles, and an ion exchange layer which has ion exchange particles. Therefore, at least three functional layers are proposed for the multilayer filter material, which differ from one another by different cleaning functions. According to the invention, these cleaning functions or respectively functional layers are coordinated with one another in a targeted manner so that a particularly efficient cleaning effect occurs for a variety of odorous substances. In particular, it has been found that with the three proposed layers of different adsorbents, the following harmful substances were able to be removed from the respective air stream particularly efficiently: ammonia, acetaldehyde, hydrogen sulphide, 2-butanone, trimethylamine, hexanal, propionic acid and n-butane. Through a variety of investigations, it has been surprisingly found here that a multilayer arrangement of these different adsorbents displays a higher efficiency than a single-layer arrangement of a corresponding mixture of these adsorbents. As basically only these three functional layers are necessary, an associated air filter element can also be realized with a comparative low throughflow resistance.

A configuration has proved to be particularly expedient here in which the active layer is arranged between the ion exchange layer and the impregnation layer.

For use, it has proved to be advantageous if the ion exchange layer is arranged in installed state upstream of the impregnation layer with respect to a throughflow direction provided for the filter material.

Particularly high degrees of adsorption can be realized by the following embodiments, which can be realized alternatively or cumulatively or in any desired combination. For example, an ash content of the active layer can be limited to a maximum of 3% by weight. Preferably, the ash content in the active layer is less, in particular at least 50% less, than in the impregnation layer. In addition, the active layer can have non-impregnated active carbon particles, which have substantially a grain size of 30×60 or 30×70 mesh, wherein mesh corresponds to the mesh width of a sieve which is still penetrable for a granulate with the said grain size.

The impregnation layer can be produced with active carbon particles, wherein the "impregnation" lies in that the adsorption capability of the active carbon particles for hydrocarbons has been reduced by an additive. For example, the active carbon particles have been treated by means of an acid and/or basic or respectively alkaline solution. For example, the impregnation layer can have active carbon particles impregnated with potassium iodide. Additionally or alternatively, the impregnation layer can have active carbon particles impregnated with potassium carbonate (potash). A variant is preferred, in which the impregnation layer has both a component of active carbon particles impregnated with potassium iodide and also a component of active carbon particles impregnated with potassium carbonate. Preferably, here, the component impregnated with potassium iodide is greater than the component impregnated with potassium carbonate. In particular, the component impregnated with potassium iodide is approximately twice as great as the component impregnated with potassium carbonate. A composition is particularly advantageous here, in which the impregnation layer has a weight component of 10% active carbon particles impregnated with potassium iodide, a weight component of 5% active carbon particles impregnated with potassium carbonate, wherein the remaining 85% by weight consists of non-impregnated active carbon particles and ash. The ash occurring during the activation of the active carbon likewise has an impregnating effect, because it clogs pores of the active carbon and thereby reduces the surface available for the adsorption of the hydrocarbons. The above percentages can vary here by ±2%-points between the individual components.

The ion exchange layer can basically be configured so that it permanently binds interfering anions and/or interfering cations to it. The ion exchange layer preferably has cation exchange particles. In particular, the ion exchange layer can have ion exchange particles with sulphonic acid groups. Furthermore, the ion exchange particles can be configured to be at least partially fibrous and to be incorporated into a layer of non-woven material with filter material fibres. The filter material fibres can be, for example, plastic fibres or cellulose fibres or a mixture thereof. Likewise, it is conceivable to configure the ion exchange particles to be at least partially pulverulent and to incorporate them into a non-woven material layer with filter material fibres, wherein here, again, plastic fibres and/or cellulose fibres can also come into use for the non-woven material layer.

Furthermore, it has surprisingly proved to be particularly advantageous to follow a particular sequence for the different functional layers. Accordingly, an increased efficiency can be achieved according to a preferred embodiment, when the active layer is arranged between the impregnation layer and the ion exchange layer, preferably so that the active layer on the one side directly adjoins the impregnation layer, and on the other side directly adjoins the ion exchange layer.

In addition to the sequence of the individual functional layers, it has furthermore been surprisingly found that a particular sequence of the functional layers is also important in the case of the throughflow with the air stream which is to be cleaned. According to a preferred further development, which is distinguished through a particularly high efficiency with regard to the cleaning effect for odorous substances, the ion exchange layer is arranged on the inflow side, whereas the impregnation layer is arranged on the outflow side. The active layer is situated again between the ion exchange layer and the impregnation layer.

According to another advantageous embodiment, the impregnation layer can have a non-woven material of filter material fibres and can form an outer side of the filter material. The impregnation layer serves here, at the same time, as a support layer for the filter material. Additionally or alternatively, the ion exchange layer can have a non-woven material of filter material fibres and can form an outer side of the filter material. In this case, the ion exchange layer serves as support layer for the filter material. In so far as the two above variants are realized cumulatively, the filter material has precisely three functional layers, namely the impregnation layer, preferably on the outflow side, serving as support layer, the ion exchange layer, preferably on the inflow side, serving as support layer, and the active layer arranged between the impregnation layer and the ion exchange layer.

According to an advantageous embodiment, the further layers can have at least one additional layer, which can be provided in addition to the ion exchange layer. Such an additional layer can be configured e.g. as a support layer or as a particle filter layer, which is explained in greater detail further below. In an extreme case, the filter material therefore has only the ion exchange layer and one such additional layer. However, preferably an active layer, an impregnation layer and one or more additional layers are provided as further layers.

In an alternative embodiment, the ion exchange layer on the one side can directly adjoin the active layer, and on the other side can directly adjoin a separate, further additional layer, which can also be designated below as first additional layer and in particular also as additional layer on the inflow side. Additionally or alternatively, the impregnation layer can directly adjoin, on the one side, the active layer, and on the other side can directly adjoin a separate, further additional layer, which with regard to the additional layer already mentioned above can also be designated as second, and in particular also as additional layer on the outflow side. In the case of a cumulative realization of the above variants, the filter material has precisely five layers, namely in particular, successively in the throughflow direction, the first additional layer, the ion exchange layer, the active layer, the impregnation layer and the second additional layer.

In an alternative structure, a third separate additional layer can be provided. In this case, the ion exchange layer on the one side directly adjoins a first additional layer, whereas the impregnation layer on the one side directly adjoins the active layer and on the other side directly adjoins a second additional layer. The ion exchange layer, on the other side, now directly adjoins a third additional layer, which in turn directly adjoins the active layer. Therefore, in this case, the filter material consists of the ion exchange layer, the active layer, the impregnation layer and the three additional layers.

Another alternative, furthermore, proposes a fourth additional layer. In this case, provision is made here that the ion exchange layer on the one side directly adjoins a first additional layer, that the impregnation layer on the one side directly adjoins a second additional layer, that the ion exchange layer on the other side directly adjoins a third additional layer, that the impregnation layer on the other side directly adjoins a fourth additional layer, and that the active layer on the one side directly adjoins the third additional layer and on the other side directly adjoins the fourth additional layer. Consequently, in this case, the filter material consists of the ion exchange layer, the active layer, the impregnation layer and the four additional layers.

The respective support layer can be composed having a single layer or having multiple layers. The respective additional layer can be configured e.g. as a single-layered or multi-layered support layer, which has substantially no filtration effect, but rather serves principally for the stiffening of the filter material. For example, such a support layer can be characterized in that it is penetrable by solid and/or liquid particles up to a grain size of 1 mm. The support layer can be impenetrable here by relatively large particles, e.g. by particles starting from a grain size of 1 mm. In this respect, the support layer can so be designated as a macro filter layer.

Alternatively thereto, the respective additional layer can be configured as a single-layered or multi-layered particle filter layer, which is distinguished by a significant filtration effect, usually, however, is rather more flexible. For example, such a particle filter layer is characterized in that it is already impenetrable by liquid and/or solid particles starting from a grain size of 0.1 mm. In this case, the particle filter layer is configured as a micro filter layer. It can also be configured as a nano filter layer, if it is already impenetrable by particles starting from a grain size of 0.1 □m. Such a particle filter layer can, however, also contribute to the stiffness of the filter material and, in this respect, can develop a certain supporting effect.

Preferably, provision can be made that at least one such additional layer is configured as a support layer, which is penetrable by particles having a grain size of less than 1 mm. Additionally or alternatively, provision can be made that at least one such additional layer is configured as a particle filter layer, which is impenetrable by particles having a grain size of greater than 0.1 mm. Preferably, provision can be made here that the respective additional layer, if it forms an inflow side or an outflow side of the filter material, is configured as a support layer which is penetrable by particles having a grain size of less than 1 mm, whereas the respective additional layer, if it forms neither an inflow side nor an outflow side of the filter material, can be expediently configured as a particle filter layer which is impenetrable by particles having a grain size of greater than 0.1 mm. Likewise, it is conceivable to configure the additional layers lying on the exterior as particle filter layers, and the additional layers lying on the interior as support layers. Expediently, the individual layers are coordinated with one another so that in the throughflow direction with regard to the filtration effect, a gradient from coarse to fine occurs, so that the coarser impurities, such as e.g. particles, are caught first, whereas the finer impurities can penetrate deeper into the filter material. Hereby, the entire thickness of the filter material can be utilized for the accumulating of impurities. Thereby, also, a protection of the active layers from particles arises. For example, the pore size of the additional layers can increase from the inflow side to the outflow side, in so far as two or more additional layers come into use, in particular from macro filter layer via micro filter layer to nano filter layer.

Layers adjoining one another can be glued to one another. Likewise, a thermal connection is possible, e.g. by plasticizing.

An interior air filter element according to the invention for an interior air filter device of an air conditioning system of a vehicle has a filter body, which is formed by means of a filter material of the type described above. Preferably, the filter material is pleated, therefore folded, in the filter body. The filter body can be configured here so as to be flat and even or ring-shaped. The associated filter element is then designed as a flat filter element or as a ring filter element. Basically, however, any other geometries are also conceivable for the filter body or respectively for the filter element.

An air conditioning system according to the invention for a vehicle is equipped with an interior air filter device, which in turn is equipped with at least one interior air filter element of the type mentioned above. Expediently here the ion exchange layer is arranged upstream of the active layer, whereas the impregnation layer is arranged downstream of the active layer.

The relative specifications "upstream" and "downstream" refer in the present context to a flow direction of the air stream which is to be cleaned in the region of the respective filter element, which occurs during operation of the air conditioning system during the throughflow of the respective filter element.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar or functionally identical components.

BRIEF DESCRIPTION OF THE DRAWINGS

There are shown, respectively diagrammatically.

DETAILED DESCRIPTION

Figure 1:
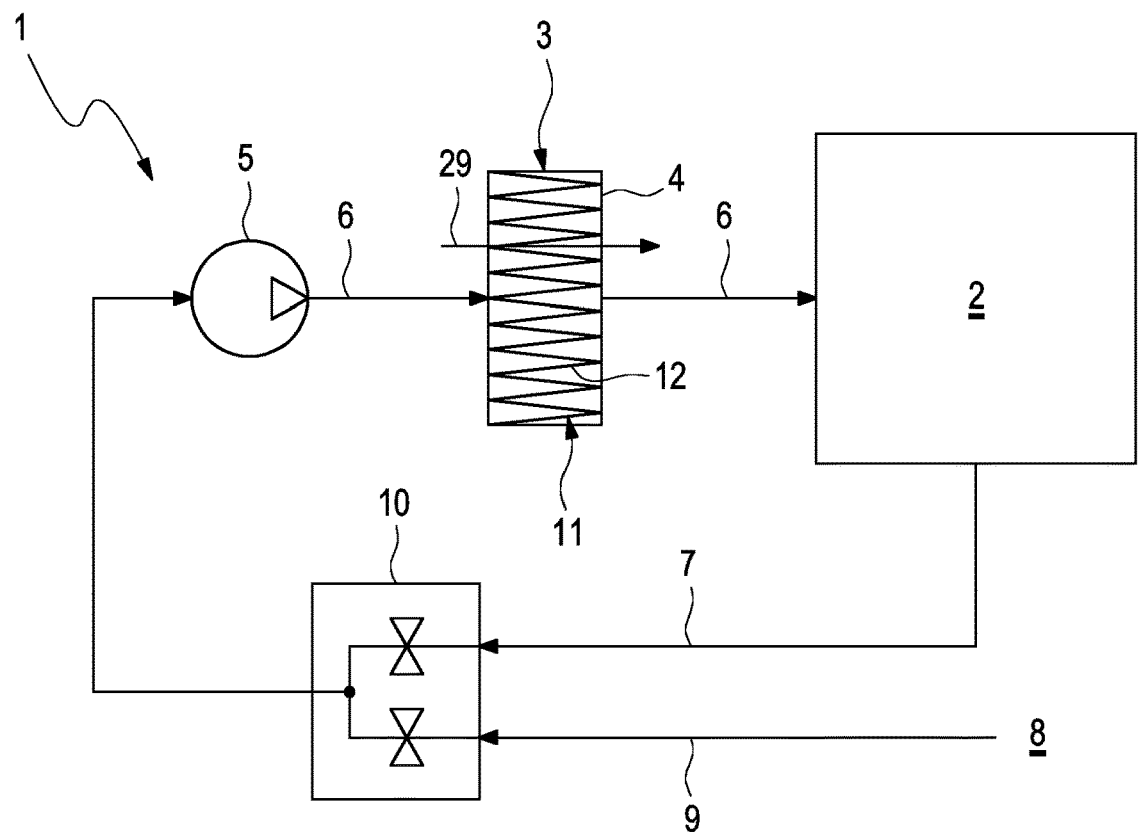
FIG. 1 a greatly simplified schematic diagram of an air conditioning system, in the manner of a circuit diagram, FIG. 2 through 6 respectively a sectional view of a multilayer filter material in various embodiments.

According to FIG. 1, an air conditioning system 1, which serves for the air conditioning of a vehicle interior 2 of a vehicle, which is otherwise not shown, comprises an interior air filter device 3, which is equipped with at least one interior air filter element 4. The interior air filter device 3 can also be designated in the following in abbreviated form as filter device 3. The interior air filter element 4 can also be designated in the following in abbreviated form as filter element 4. The air conditioning system 1 further comprises a fan 5 for generating an air stream 6, which is supplied to the interior 2. Here, the air stream 6 is directed through the filter device 3 or respectively through the filter element 4, whereby the air stream 6 is cleaned. The fan 5 can draw in circulating air 7 here from the interior 2. In addition, the fan 5 can draw in fresh air 9 from an environment 8 of the vehicle. By means of a flap device 10, a switchover can be carried out between a circulating air operation, in which only circulating air 7 is drawn in and supplied to the interior 2, a fresh air operation, in which only fresh air 9 is drawn in and supplied to the interior 2, and a mixed operation, in which both circulating air 7 and also fresh air 9 are drawn in and supplied to the interior 2. Further typical components of the air conditioning system 1, such as e.g. a heating device and a cooling device, are omitted here to maintain clarity.

The filter element 4 has a filter body 11, which is formed by means of a filter material 12. Expediently, the filter material 12 is folded in the filter body 11. In the example of FIG. 1, the filter body 11 is illustrated in a plate-shaped and flat manner. Basically, a ring-shaped filter body 11 can also be provided. During operation of the air conditioning system 1, the air stream 6 flows through the filter element 4 or respectively the filter body 11 and therefore ultimately also through the filter material 12 in a throughflow direction 29. Accordingly, the filter material 12 can have, according to structure, a throughflow direction 29 provided for the correct installed state or respectively usage state, which must be maintained so that the filter material 12 or respectively the filter element 4 equipped therewith can develop the intended filtration effect(s).

The filter material 12 coming into use here is designed so as to be multi-layered and is explained in further detail below with the aid of FIG. 2 to 6.

In accordance with FIG. 2 to 6, the filter material 12 which is presented here is configured so as to be multi-layered, namely at least two-layered, preferably at least three-layered. In all embodiments, the filter material 12 comprises at least one ion exchange layer 13, and at least one further layer. All the embodiments shown here are at least three-layered, wherein in addition to the ion exchange layer 13 at least one active layer 14 and at least one impregnation layer 15 are provided. Therefore, the filter material 12 which is presented here preferably comprises at least these three functional layers 13, 14, 15, which act in an adsorbing manner with respect to odorous substances. As the individual functional layers 13, 14, 15 can, furthermore, filter out particulate impurities from the air stream 6, the filter element 4 can also be designated as a hybrid filter.

The respective individual functional layer 13, 14, 15 can, in turn, be designed so as to be multi-layered or having multiple plies, therefore can consist of two or more individual layers lying against one another. However, the embodiment which is shown here is preferred, in which the at least three functional layers 13, 14, 15 can be respectively designed having a single layer.

The active layer 14 has principally, therefore as principal component, non-impregnated active carbon particles 16. Preferably the component of non-impregnated active carbon particles 16 is at least 85% by weight, preferably at least 90% by weight, in particular at least 95% by weight. The active layer 14 can have, in addition, an ash component, which is a maximum of 5% by weight and preferably a maximum of 3% by weight. This ash arises during the preparation of the active carbon, in which the "normal" carbon is activated at a high temperature of e.g. approximately 1,000° C. The non-impregnated active carbon particles 16 preferably have a grain size of approximately 30×60 or 30×70 mesh.

The impregnation layer 15 has impregnated active carbon particles 17, 18. Preferably, the component of impregnated active carbon particles 17, 18 is at least 5% by weight, preferably at least 10% by weight, in particular at least 15% by weight. For example, the impregnation layer 15 can have first active carbon particles 17, which are impregnated with potassium iodide. Additionally or alternatively, second active carbon particles 18 can be provided, which are impregnated with potassium carbonate. Finally, the impregnation layer 15 can have, in addition, third active carbon particles 19, which are not impregnated by means of an additive. However, the impregnation layer 15 can also have ash which acts in an impregnating manner for the active carbon, because it clogs pores of the active carbon and thereby reduces the adsorption capability with regard to hydrocarbons. Preferably, the impregnation layer 15 therefore has an ash content which is greater than in the active layer 14. Basically, these non-impregnated third active carbon particles 19 of the impregnation layer 15 can be the same non-impregnated active carbon particles 16, which also come into use in the active layer 14. A composition for the impregnation layer 15 is preferred, in which approximately 10% by weight first active carbon particles 17 impregnated with potassium iodide, approximately 5% by weight second active carbon particles 18 impregnated with potassium carbonate, and a remainder of approximately 85% by weight third non-impregnated active carbon particles 19 and ash are present. In the impregnation layer 15, therefore, the non-impregnated active carbon particles 19 have a weight proportion of less than 85%, preferably less than 80%.

The ion exchange layer 13 has ion exchange particles 20. Expediently, the ion exchange layer 13 is hygroscopic and contains ions which form a toxic environment with water. In particular, the ion exchange layer 13 contains acid ions, which form an acid environment with water. The ion exchange particles 20 are preferably cation exchange particles. The ion exchange particles 20 can contain sulphonic acid groups. Expediently, in addition, provision can be made that the ion exchange particles 20 are configured at least partially to be fibrous and are incorporated here into a non-woven material layer with filter material fibres. Likewise, it is conceivable to configure the ion exchange particles 20 at least partially to be pulverulent and to incorporate them into a non-woven layer with filter material fibres. Likewise, a combined embodiment is conceivable, in which both fibrous and also pulverulent ion exchange particles 20 are present.

The individual functional layers 13, 14, 15 have, within the filter material 12, a preferred arrangement or respectively sequence, in which the active layer 14 is arranged between the ion exchange layer 13 and the impregnation layer 15. Preferably, the filter material 12 manages here without intermediate layers, so that the active layer 14 on the one side directly adjoins the impregnation layer 15 and on the other side directly adjoins the ion exchange layer 13. In FIG. 2 to 6 in addition the air flow 6 is symbolized by arrows, in order to indicate the throughflow direction 29 of the filter material 12 occurring in the installed state. Accordingly, the filter material 12 has an inflow side 21 on the entry side, facing the incoming air flow 6, which inflow side can also be designated as entry side 21, and an outflow side 22 on the exit side, facing away therefrom, which can also be designated as exit side 22.

Preferably, accordingly, the ion exchange layer 13 is arranged on the inflow side, therefore facing the inflow side 21, whereas the impregnation layer 15 is arranged on exit side and faces the outflow side 22.

Figure 2:
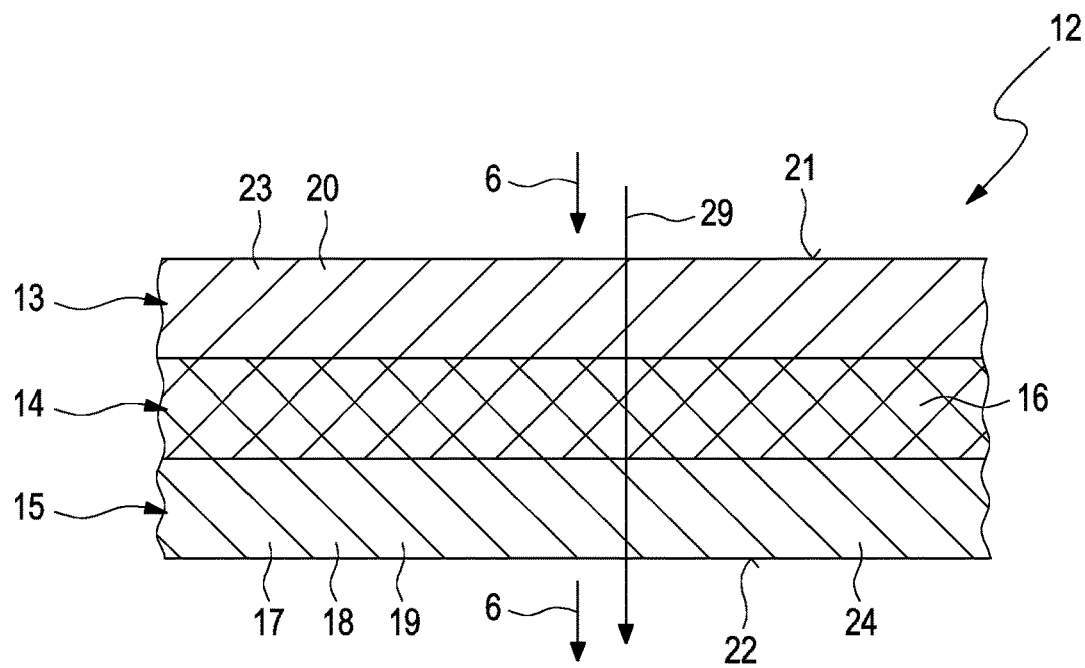

In the embodiment shown in FIG. 2, the ion exchange layer 13 has a non-woven material 23 of filter material fibres, into which the ion exchange particles 20 are embedded. By means of the non-woven material 23, the ion exchange layer 13 is sufficiently stable, so that it can form a support layer for the filter material 12. Accordingly, in this embodiment, the ion exchange layer 13 can form an outer side, here the inflow side 21, of the filter material 12. In this embodiment, in addition, the impregnation layer 15 is also formed with a non-woven material 24 of filter material fibres, into which the impregnated active carbon particles 17, 18, and if applicable also the non-impregnated active carbon particles 19, are incorporated. Accordingly, by means of the non-woven material 24, the impregnation layer 15 can also form a support layer for the filter material 12. In the example, the impregnation layer 15 therefore likewise forms an outer side, namely the exit side 22 of the filter material 12. In the embodiment shown in FIG. 2, the filter material 12 therefore has precisely three layers, namely the said functional layers 13, 14, 15, therefore the ion exchange layer 13, the active layer 14 and the impregnation layer 15. As mentioned above, the respective functional layer 13, 14, 15 can be, in itself, multi-layered or respectively have multiple plies.

Figure 3:
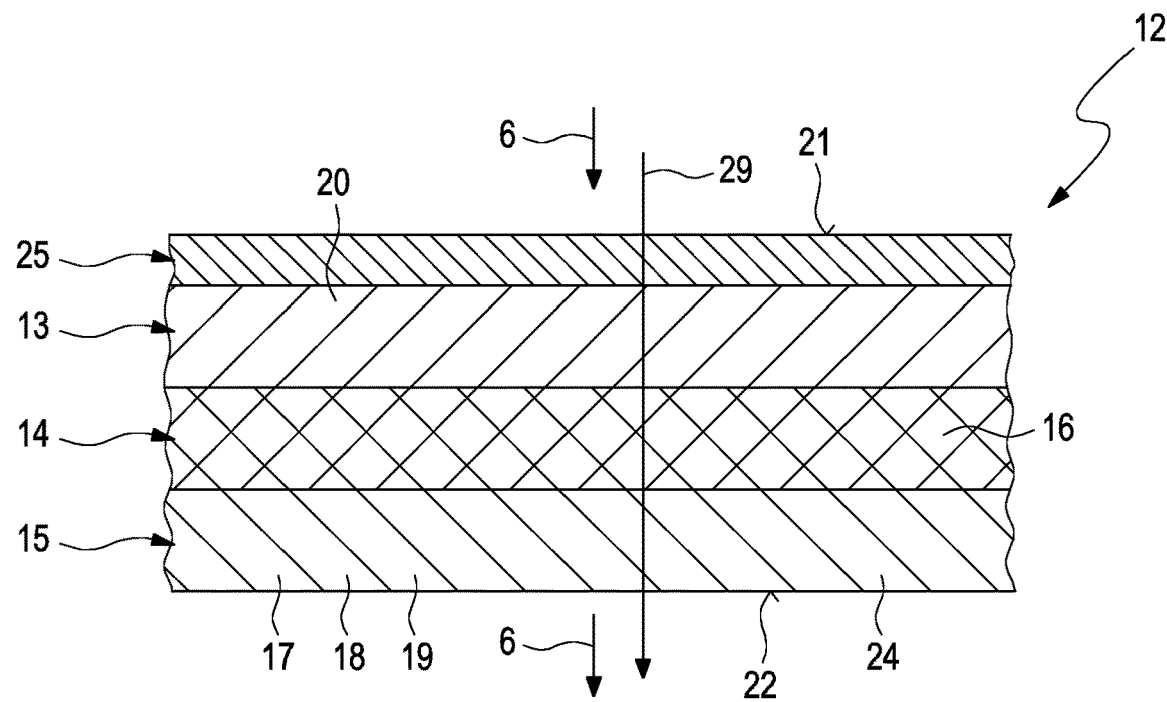

According to FIG. 3, the filter material 12 can have, on the inflow side, an inflow-side or first additional layer 25, which then forms the inflow side 21 or entry side 21 of the filter material 12. The additional layer 25 here is expediently a non-woven material of filter material fibres and can, according to pore side, be configured as a support layer or as a particle filter layer. The ion exchange layer 13 then directly adjoins on the one side the active layer 14 and on the other side this first additional layer 25 respectively directly. For support on the outflow side, the filter material 12 can again have, as in FIG. 3, the impregnation layer 15 reinforced with the non-woven material 24. However, the embodiment shown in FIG. 4 is preferred.

Figure 4:
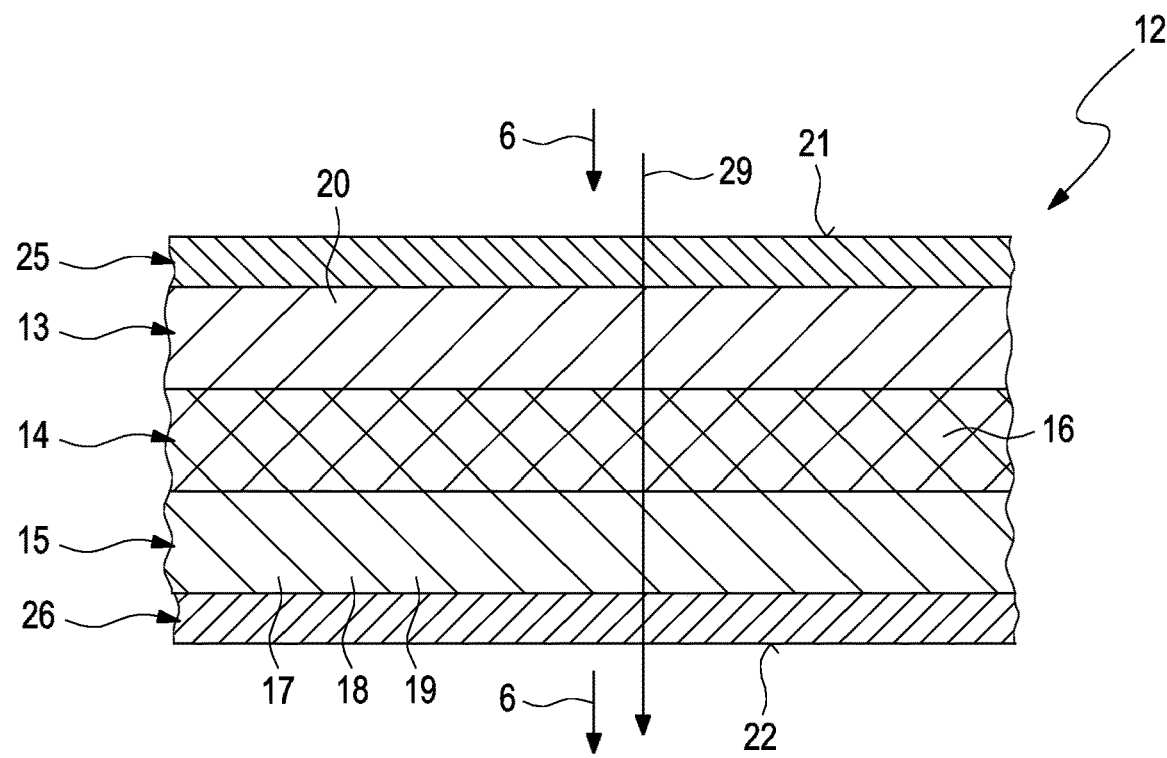

According to FIG. 4, the filter material 12 has, in addition to the first additional layer 25 on the inflow side, a second additional layer 26 on the outflow side, which in this case forms the outflow side 22 or respectively the exit side 22 of the filter material 12. The impregnation layer 15 thereby directly adjoins on the one side the active layer 14 and on the other side the second additional layer 26 respectively directly. In this embodiment, the filter material 12 has precisely five layers, namely the three functional layers 13, 14, 15 and the two additional layers 25, 26. As mentioned, the respective individual layer can be designed here respectively so as to be multi-layered or respectively having multiple plies. The second additional layer 26 is expediently likewise a non-woven material of filter material fibres and can be configured, depending on pore size, as a support layer or as a particle filter layer.

Alternatively, a further embodiment is conceivable in an analogous manner to the variant shown in FIG. 3, in which likewise only one additional layer is present, namely only the second additional layer 26 on the outflow side 22. In this case, the ion exchange layer 13 is then reinforced with the non-woven material 23 again as in FIG. 2. In this case and in the case of FIG. 3, the filter material 12 then has four layers, namely the three functional layers 13, 14, 15 and the respective additional layer 25 or respectively 26. As mentioned, the respective individual layer here can, in itself, again be designed so as to be multi-layered.

Figure 5:
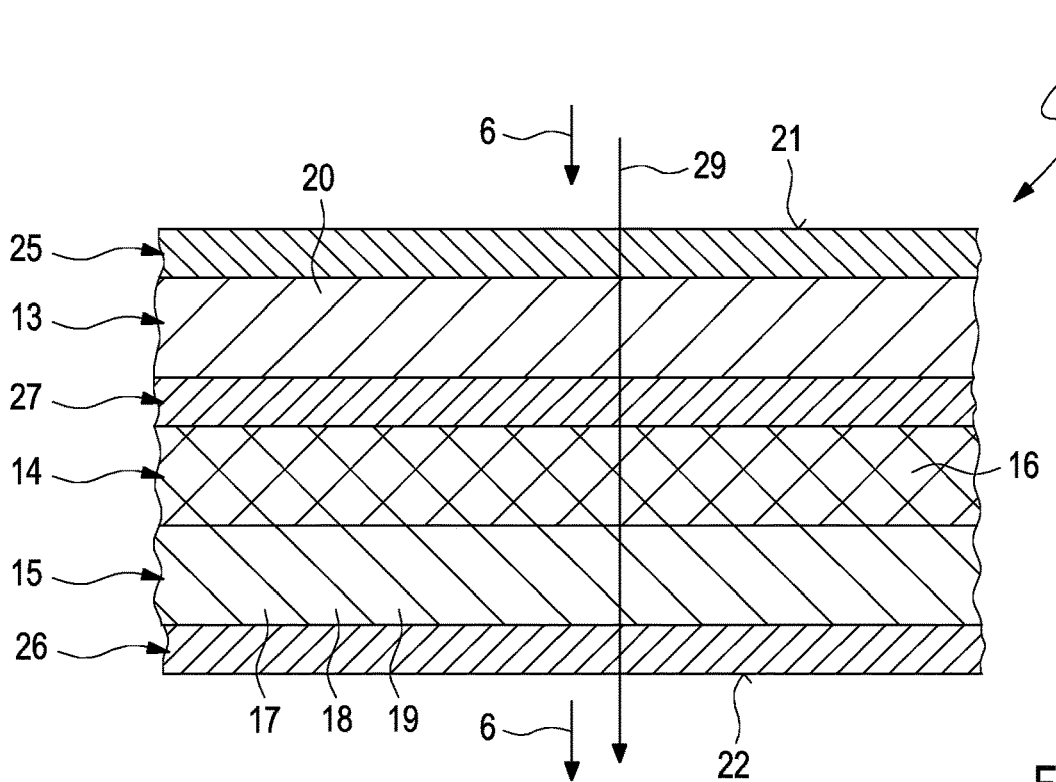

According to FIG. 5, in an alternative structure in addition a third separate additional layer 27 can be provided. In this case, the ion exchange layer 13 on the one side directly adjoins the first additional layer 25, whereas the impregnation layer 15 on the one side directly adjoins the active layer 14 and on the other side directly adjoins the second additional layer 26. The ion exchange layer 13 now on the other side directly adjoins the third additional layer 27, which in turn directly adjoins the active layer 14. Therefore, in this case, the filter material 12 consists of the ion exchange layer 13, the active layer 14, the impregnation layer 15 and the three additional layers 25, 26, 27. The individual layers 13, 14, 15, 25, 26, 27 follow one another in the throughflow direction 29 of the filter material 12, provided for the installed state, from the inflow side 21 to the outflow side 22 as follows: The first additional layer 26 comes first, thereafter the ion exchange layer 13, the third additional layer 27, the active layer 14 and the impregnation layer 15 follow one another, and the second additional layer 26 follows last.

Figure 6:
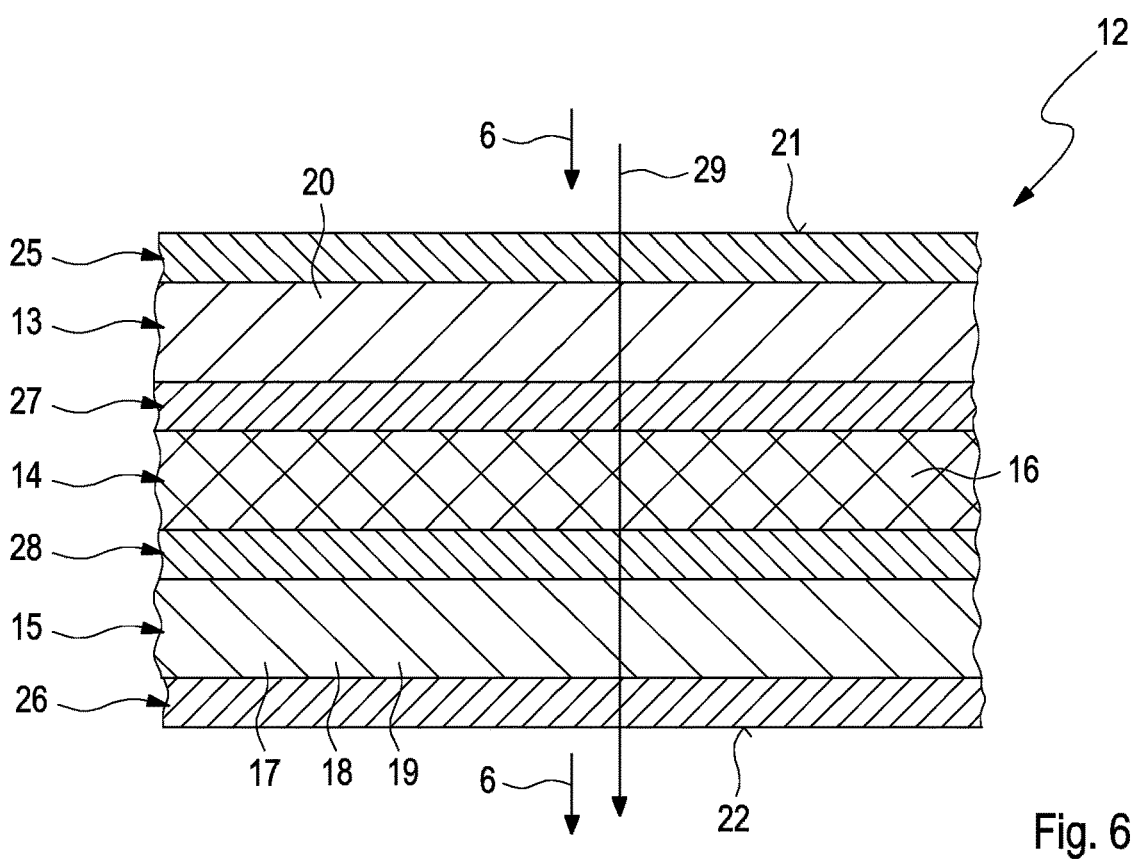

According to FIG. 6, for a further embodiment in addition a fourth additional layer 28 is proposed. In this case, provision is made accordingly that the ion exchange layer 13 on the one side directly adjoins the first additional layer 25, that the impregnation layer 15 on the one side directly adjoins the second additional layer 26, that the ion exchange layer 13 on the other side directly adjoins the third additional layer 27, that the impregnation layer 15 on the other side directly adjoins the fourth additional layer 28, and that the active layer 14 on the one side directly adjoins the third additional layer 27 and on the other side directly adjoins the fourth additional layer 28. Consequently, in this case the filter material 12 consists of the ion exchange layer 13, the active layer 14, the impregnation layer 15 and the four additional layers 25, 26, 27, 28. The individual layers 13, 14, 15, 25, 26, 27, 28 follow one another in the throughflow direction 29 of the filter material 12, provided for the installed state, from the inflow side 21 to the outflow side 22 as follows: The first additional layer 25 comes first, thereafter the ion exchange layer 13, the third additional layer 27, the active layer 14, the fourth additional layer 28 and the impregnation layer 15 then follow one another, and the second additional layer 26 follows last.

In so far as the above-mentioned additional layers 25, 26, 27, 28 also have a filtration function for particulate impurities and are accordingly configured as particle filter layers, these filtration functions can be transferred to these "passive" additional layers 25, 26, 27, 28, which relieves the "active" functional layers 13, 14, 15 accordingly of these filtration functions. These additional layers 25, 26, 27, 28 therefore serve in a non-active manner for the adsorption of usual gaseous odorous substances and therefore in particular do not contain any active carbon particles. The additional layers 25, 26, 27, 28 are accordingly preferably free of active carbon.

The invention claimed is:

1. A multilayer filter material for an interior air filter element of an air conditioning system of a vehicle, comprising:
    an ion exchange layer including ion exchange particles;
    a plurality of further layers;
    the ion exchange layer directly adjoining at least one of the plurality of further layers;
    the plurality of further layers including an active layer, which includes non-impregnated active carbon particles, and an impregnation layer, which includes impregnated active carbon particles;
    the active layer arranged between the ion exchange layer and the impregnation layer;
    wherein the ion exchange layer is hygroscopic and contains ions which form a toxic environment with water;
    wherein the impregnation layer includes a component of active carbon particles impregnated with potassium iodide and a component of active carbon particles impregnated with potassium carbonate; and
    wherein a weight % of the impregnation layer provided by the component impregnated with potassium iodide is greater than a weight % of the impregnation layer provided by the component impregnated with potassium carbonate.

2. The filter material according to claim 1, wherein the ion exchange layer includes acid ions which form an acid environment with water.

3. The filter material according to claim 1, wherein the ion exchange layer includes cation exchange particles.

4. The filter material according to claim 1, wherein the ion exchange layer includes ion exchange particles including sulphonic acid groups.

5. The filter material according to claim 1, wherein the ion exchange particles are at least partially fibrous and are incorporated into a non-woven material layer including filter material fibres.

6. The filter material according to claim 1, wherein the ion exchange particles are at least partially pulverulent and are incorporated into a non-woven material layer including filter material fibres.

7. The filter material according to claim 1, wherein at least one of:
    the active layer has an ash content of 5% by weight or less; and
    the active layer includes active carbon particles having a grain size of at least one of 30×60 mesh and 30×70 mesh.

8. The filter material according to claim 1, wherein the impregnation layer contains approximately 10% by weight of the component impregnated with potassium iodide and approximately 5% by weight of the component impregnated with potassium carbonate.

9. The filter material according to claim 1, wherein the active layer on one side directly adjoins the impregnation layer and on another side directly adjoins the ion exchange layer.

10. The filter material according to claim 1, wherein:
    the impregnation layer includes a non-woven material of filter material fibres and forms an outer side of the filter material;
    the ion exchange layer includes a non-woven material of filter material fibres and forms another outer side of the filter material; and
    the filter material includes only the ion exchange layer, the active layer and the impregnation layer.

11. The filter material according to claim 1, wherein:
    the plurality of further layers further includes two additional layers;
    the ion exchange layer on one side directly adjoins the active layer and on another side directly adjoins a first additional layer;
    the impregnation layer on one side directly adjoins the active layer and on another side directly adjoins a second additional layer; and
    the filter material consists of the ion exchange layer, the active layer, the impregnation layer and the two additional layers.

12. The filter material according to claim 1, wherein:
    the plurality of further layers further includes three additional layers;
    the ion exchange layer on one side directly adjoins a first additional layer;
    the impregnation layer on one side directly adjoins the active layer and on another side directly adjoins a second additional layer;
    the ion exchange layer on another side directly adjoins a third additional layer, which directly adjoins the active layer; and
    the filter material consists of the ion exchange layer, the active layer, the impregnation layer and the three additional layers.

13. The filter material according to claim 1, wherein:
    the plurality of further layers further includes four additional layers;
    the ion exchange layer on one side directly adjoins a first additional layer;
    the impregnation layer on one side directly adjoins a second additional layer;
    the ion exchange layer on another side directly adjoins a third additional layer;
    the impregnation layer on another side directly adjoins a fourth additional layer;

the active layer on one side directly adjoins the third additional layer and on another side directly adjoins the fourth additional layer; and the filter material consists of the ion exchange layer, the active layer, the impregnation layer and the four additional layers.

14. The filter material according to claim 11, wherein at least one of:
at least one of the two additional layers is configured as a support layer which is penetrable by particles having a grain size of less than 1 mm; and
at least one of the two additional layers is configured as a particle filter layer which is impenetrable by particles having a grain size of greater than 0.1 mm.

15. The filter material according to claim 1, wherein the ion exchange layer, with respect to a throughflow direction of the filter material in an installed state, is arranged upstream of the impregnation layer.

16. An interior air filter element for an air conditioning system of a vehicle, comprising a filter body and a filter material, the filter material including:
a hygroscopic ion exchange layer including ion exchange particles and ions which form a toxic environment with water;
a plurality of further layers including an active layer and an impregnation layer, at least one of the plurality of further layers directly adjoining the ion exchange layer, the active layer including non-impregnated active carbon particles and arranged between the ion exchange layer and the impregnation layer, the impregnation layer including impregnated active carbon particles, a component of active carbon particles impregnated with potassium iodide, and a component of active carbon particles impregnated with potassium carbonate; and
wherein a weight % of the impregnation layer provided by the component impregnated with potassium iodide is greater than a weight % of the impregnation layer provided by the component impregnated with potassium carbonate.

17. The interior air filter element according to claim 16, wherein the ion exchange layer, with respect to a throughflow direction of the filter material in an installed state, is arranged upstream of the impregnation layer.

18. An air conditioning system for a vehicle, comprising an interior air filter device including at least one interior air filter element, the at least one interior air filter element including a filter body and a filter material, the filter material including:
a hygroscopic ion exchange layer including ion exchange particles and ions which form a toxic environment with water;
a plurality of further layers including an active layer and an impregnation layer, at least one of the plurality of further layers directly adjoining the ion exchange layer, the active layer including non-impregnated active carbon particles and arranged between the ion exchange layer and the impregnation layer, the impregnation layer including impregnated active carbon particles, the impregnated active carbon particles including a component of active carbon particles impregnated with potassium iodide and a component of active carbon particles impregnated with potassium carbonate; and
wherein a proportion of the component impregnated with potassium iodide in the impregnation layer is greater than a proportion of the component impregnated with potassium carbonate in the impregnation layer.

19. The air conditioning system according to claim 18, wherein at least one of:
the ion exchange layer is arranged upstream of the active layer and the impregnation layer is arranged downstream of the active layer; and
the impregnation layer contains approximately 10% by weight of the component impregnated with potassium iodide and approximately 5% by weight of the component impregnated with potassium carbonate.

20. The filter material according to claim 13, wherein:
at least one of the four additional layers is configured as a support layer penetrable by particles having a grain size of less than 1 mm; and
at least one of the four additional layers is configured as a particle filter layer impenetrable by particles having a grain size of greater than 0.1 mm.

* * * * *